United States Patent
Tarao

(10) Patent No.: US 7,628,714 B2
(45) Date of Patent: Dec. 8, 2009

(54) GOLF BALL AND PROCESS FOR PREPARING THE SAME

(75) Inventor: Toshiyuki Tarao, Kobe (JP)

(73) Assignee: SRI Sports Limited, Kobe (JP)

( * ) Notice: Subject to any disclaimer, the term of this patent is extended or adjusted under 35 U.S.C. 154(b) by 78 days.

(21) Appl. No.: 11/638,557

(22) Filed: Dec. 14, 2006

(65) Prior Publication Data

US 2007/0142127 A1 Jun. 21, 2007

(30) Foreign Application Priority Data

Dec. 16, 2005 (JP) .............................. 2005-363753

(51) Int. Cl.
*A63B 37/06* (2006.01)
(52) U.S. Cl. ..................................... 473/378
(58) Field of Classification Search ................ 473/378, 473/351

See application file for complete search history.

(56) References Cited

U.S. PATENT DOCUMENTS

| | | | |
|---|---|---|---|
| 3,395,109 A | 7/1968 | Molitor et al. |
| 3,989,568 A | 11/1976 | Isaac |
| 4,123,061 A | 10/1978 | Dusbiber |
| 4,248,432 A | 2/1981 | Hewitt et al. |
| 5,334,673 A | 8/1994 | Wu |
| 6,123,628 A | 9/2000 | Ichikawa et al. |
| 2003/0064833 A1 | 4/2003 | Ichikawa et al. |

FOREIGN PATENT DOCUMENTS

| | | |
|---|---|---|
| JP | 51-74726 | 6/1976 |
| JP | 2662909 B2 | 6/1997 |
| JP | 11-178949 A | 7/1999 |
| JP | 2002-336379 A | 11/2002 |

*Primary Examiner*—Raeann Trimiew
(74) *Attorney, Agent, or Firm*—Birch, Stewart, Kolasch & Birch, LLP

(57) ABSTRACT

The object of the present invention is to provide a golf ball which is excellent in abrasion-resistance, durability and resilience and a process for preparing the same.

The gist of the present invention resides in using a cover composition having a thermoplastic polyurethane and a heat reactive microcapsule encapsulating a polyisocyanate; during the molding of the cover, the polyisocyanate is contained inside the microcapsule to inhibit the crosslinking reaction between the polyisocyanate and the thermoplastic polyurethane to maintain the moldability of the cover, while, after the molding of the cover, the golf ball body is heated in order to promote a crosslinking reaction between the polyisocyanate released from the microcapsule and the thermoplastic polyurethane to improve the abrasion-resistance, durability and resilience of the resultant urethane cover.

19 Claims, No Drawings

GOLF BALL AND PROCESS FOR PREPARING THE SAME

BACKGROUND OF THE INVENTION

1. Field of the Invention

The present invention relates to a golf ball and a process for preparing the same, more particularly to improving abrasion-resistance, durability and resilience of the golf ball having a cover containing a urethane resin as a base resin.

2. Description of the Related Art

As a base resin which constitutes a cover of a golf ball, ionomer resin and polyurethane are used. The cover using the ionomer resin is widely used for its excellent resilience, durability and workability, but because of its high rigidity and hardness, problems such as bad shot feeling, inadequate spin performance and inferior controllability are pointed out. On the other hand, polyurethane is used as a base resin which constitutes the cover because it provides an improved shot feeling and spin property compared with ionomer resin. For example, Japanese unexamined patent publication No. S51-74726, Japanese patent No. 2,662,909, and U.S. Pat. No. 4,123,061 disclose a use of thermosetting polyurethane, while U.S. Pat. No. 3,395,109 and U.S. Pat. No. 4,248,432 disclose a use of thermoplastic polyurethane for a cover. A use of the thermosetting polyurethane as a cover material can provide a golf ball with excellent abrasion-resistance, but the process of preparing the golf ball becomes complicated. Further, a golf ball using thermoplastic polyurethane as a cover material has inadequate abrasion-resistance, shot feeling and resilience, compared with a golf ball using thermosetting polyurethane.

Japanese unexamined patent publication No. H11-178,949 and Japanese unexamined patent publication No. 2,002-336,379, for example, disclose an improvement of the abrasion-resistance of a cover which uses thermoplastic polyurethane. Japanese unexamined patent publication No. H11-178,949 discloses a solid golf ball having a solid core and a cover covering the solid core wherein a resin component constituting the cover contains a reaction product between a thermoplastic polyurethane elastomer and a blocked isocyanate as a main component. Further, Japanese unexamined patent publication No. 2,002-336,379 discloses an improvement of a resultant cover. Herein, an isocyanate compound (X) having at least two isocyanate groups in a molecule thereof as a functional group has been dispersed in a thermoplastic resin which is substantially non-reactive with an isocyanate group to obtain an isocyanate mixture. The isocyanate mixture is added to and crosslinked with a thermoplastic polymeric material which is substantially reactive with an isocyanate group to improve the cover.

However, the method which uses a blocked isocyanate as disclosed in Japanese unexamined patent publication No. H11-178,949 has a problem of gasification of a blocking agent which has been disassociated during the molding of the cover. Also, in the method disclosed in Japanese unexamined patent publication No. 2,002-336,379, a crosslinking reaction proceeds during the molding of the cover, since an isocyanate compound dispersed in thermoplastic resin has the reactivity. Thus, the durability of the resultant cover may be lowered in some cases.

SUMMARY OF THE INVENTION

The present invention has been achieved in view of the above circumstances. The object of the present invention is to provide a golf ball which is excellent in abrasion-resistance, durability and resilience and a process for preparing the same.

The present invention provides a golf ball comprising a core and a cover containing a crosslinked polyurethane as a base resin, wherein the crosslinked polyurethane is obtained by heating and reacting a cover composition comprising a thermoplastic polyurethane and a heat reactive microcapsule encapsulating a polyisocyanate.

The present invention also provides a process for preparing a golf ball comprising the steps of molding a cover from a cover composition comprising a thermoplastic polyurethane and a heat reactive microcapsule encapsulating a polyisocyanate to produce a golf ball body, and heating the golf ball body, thereby allowing a crosslinking reaction between the polyisocyanate of the heat reactive microcapsule and the thermoplastic polyurethane.

The gist of the present invention resides in using a cover composition having a thermoplastic polyurethane and a heat reactive microcapsule encapsulating a polyisocyanate; during the molding of the cover, the polyisocyanate is contained inside the microcapsule to inhibit the crosslinking reaction between the polyisocyanate and the thermoplastic polyurethane to maintain the moldability of the cover, while, after the molding of the cover, the golf ball body is heated in order to promote a crosslinking reaction between the polyisocyanate released from the microcapsule and the thermoplastic polyurethane to improve the abrasion-resistance, durability and resilience of the resultant urethane cover. In the crosslinking reaction, a urethane bond or a urea bond in the thermoplastic polyurethane reacts with the polyisocyanate released from the heat reactive microcapsule to generate an alophanate bond or a biuret bond which forms a crosslinking point. In view of further promoting the crosslinking reaction of the thermoplastic polyurethane with the polyisocyanate released from the heat reactive microcapsule, the thermoplastic polyurethane having a functional group reactive with an isocyanate group is preferably used. Also, the crosslinked polyurethane preferably has a slab hardness of 60D or less in shore D hardness. The heat treatment of the golf ball body is preferably conducted at a temperature of 70° C. or more for 12 hours or more.

DESCRIPTION OF THE PREFERRED EMBODIMENT

The present invention provides a golf ball comprising a core and a cover containing a crosslinked polyurethane as a base resin, wherein the crosslinked polyurethane is obtained by heating and reacting a cover composition comprising a thermoplastic polyurethane and a heat reactive microcapsule encapsulating a polyisocyanate. In the following, the present invention is explained in detail.

First, the heat reactive microcapsule encapsulating the polyisocyanate used in the present invention (hereinafter simply referred to as "heat reactive microcapsule" occasionally) is explained. The heat reactive microcapsule is not limited, as long as it releases the encapsulated polyisocyanate therein when heated. For example, the heat reactive microcapsule encapsulates the polyisocyanate with an outer shell comprising a thermoplastic resin which melts with heat. When heating the heat reactive microcapsule, the thermoplastic resin which constitutes the outer shell of the microcapsule melts and an active polyisocyanate encapsulated is released. In the present invention, preferably used is the heat reactive microcapsule that releases the polyisocyanate encapsulated by the heat treatment at a temperature of 160° C. to 200° C. for 3 minutes to 10 minutes.

The thermoplastic resin which constitutes the outer shell preferably has the softening point of 80° C. or more, more preferably 100° C. or more, even more preferably 120° C. or more, and preferably has the softening point of 250° C. or less, more preferably 200° C. or less, even more preferably 160° C. or less. If the softening point is too low, the microcapsule may be destroyed during the molding of the cover, while if the softening point is too high, the microcapsule needs to be heated at a high temperature after the molding of the cover, thus the thermoplastic polyurethane constituting the cover may be decomposed.

The thermoplastic resin which constitutes the outer shell includes, for example, polystyrene, polyethylene, polypropylene, polyurethane, polyamide, an acrylic resin, a methacrylate resin, an ethylene-acrylic copolymer, an ethylene-vinyl acetate copolymer, a vinyl chloride resin, a butadiene resin, a butene resin, a polycarbonate resin, an ABS resin and an AS resin. When using a chlorine-containing resin such as a vinyl chloride resin, a resin which is soluble in organic solvent and has the softening point around a desired temperature is preferred.

As a process for preparing the microcapsule wherein the polyisocyanate is encapsulated with the outer shell comprising the thermoplastic resin, a well known method of microcapsulization is employed. For example, in an air-suspension technique, a core material (powder) is fluidized by an air current to be suspended, and an emulsified liquid which is obtained by emulsifying a thermoplastic resin constituting the outer shell is sprayed on a surface of the suspended particle. Then the suspended air may be subjected to heat to evaporate the solvent to form capsule's outer shell. In a spray drying method, the thermoplastic resin constituting the outer shell is emulsified, and the core material is suspended in the resulting emulsion. The suspension is sprayed, microparticulated and instantaneously dried, to form a film for encapsulation. Further, a method in which powders are subjected to encapsulation in a dry manner (wherein, after mixing a core material particle and a thermoplastic resin particle smaller than the former, an impact by centrifugal force and the like is applied onto a surface of the core material to embed the thermoplastic resin on the surface of the core material for encapsulation can be employed. In addition, methods which can be employed include dispersing a diisocyanate in an aqueous solution followed by adding a polyamine (preferably a diamine) or a polyol (preferably a diol) in the aqueous solution to form a thermoplastic polyurethane-urea by an interfacial polymerization. Among them, in view of the outer shell strength of the microcapsule, a process for encapsulating powders in a dry manner is preferred.

The polyisocyanate encapsulated in the heat reactive microcapsule may include any polyisocyanate, as long as it has at least two active isocyanate groups. Examples of the polyisocyanate are an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI); and an alicyclic or aliphatic polyisocyanate such as 4,4'-dicyclohexylmethane diisocyanate ($H_{12}MDI$), hydrogenated xylylenediisocyanate ($H_6XDI$) hexamethylene diisocyanate (HDI), isophorone diisocyanate (IPDI), and norbornene diisocyanate (NBDI). The alicyclic or aliphatic polyisocyanate may be used either alone or as a mixture of at least two of them. Among them, 4,4'-diphenylmethane diisocyanate (MDI) is preferred because it has a high reactivity and can efficiently bring about cross-linking reaction.

Further, as the polyisocyanate, an isocyanate group terminated urethane prepolymer may also be used. The isocyanate group terminated urethane prepolymer is obtained preferably by reacting the above polyisocyanate with the polyol under conditions that the isocyanate group is present in excess.

The polyol constituting the isocyanate group terminated urethane prepolymer may have either low-molecular-weight or high-molecular-weight, as long as it has a plurality of hydroxyl groups. Examples of the low-molecular-weight polyols are a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high-molecular-weight polyols are a polyetherpolyol such as polyoxyethylene glycol (PEG), polyoxypropylene glycol (PPG), and polyoxytetramethylene glycol (PTMG); a condensed polyesterpolyol such as polyethylene adipate (PEA), polybutylene adipate (PBA), and polyhexamethylene adipate (PHMA); a lactone polyesterpolyol such as poly-ε-caprolactone (PCL); a polycarbonatepolyol such as polyhexamethylenecarbonate polyol; and an acrylic polyol. These polyols may be used individually or as a mixture of at least two of them.

The high-molecular-weight polyol preferably has, without limitation, the average molecular weight of 400 or more, more preferably 1,000 or more. The high-molecular-weight polyol has no limitation on the upper limit of the average molecular weight, but the high-molecular-weight polyol preferably has the average molecular weight of 10,000 or less, more preferably 8,000 or less.

In the present invention, the content of the heat reactive microcapsule having the polyisocyanate in the cover composition is preferably at least 0.05 part by mass, more preferably at least 0.1 part by mass, and preferably 20 parts by mass or less, more preferably 10 parts by mass or less relatively to 100 parts by mass of the thermoplastic polyurethane. If the content of the heat reactive microcapsule is less than 0.05 part by mass, the crosslinking reaction between the polyisocyanate and the thermoplastic polyurethane is less likely to occur. As a result, the degree of the improving effect on the abrasion-resistance and durability of the resulting cover become small. On the other hand, if the content is more than 20 parts by mass, due to the increased crosslinking sites, the melt viscosity and the melt flow-starting temperature of the polymer become higher and thus the molding becomes impossible.

Next, the thermoplastic polyurethane contained in the cover composition is explained. The thermoplastic polyurethane used in the present invention is not limited, as long as it has a plurality of polyurethane bonds within a molecule and shows thermoplasticity. For example, the thermoplastic polyurethane includes a reaction product having a urethane bond formed in a molecule by reacting a polyisocyanate with a polyol, and further with a polyamine if necessary. In the present invention, a urethane bond or a urea bond in the thermoplastic polyurethane reacts with the polyisocyanate released from the heat reactive microcapsule to form an alophanate bond or a biuret bond which forms a crosslinking point.

As the thermoplastic polyurethane, the one having a functional group reactive with the isocyanate group (hereinafter simply referred to as "isocyanate-reactive functional group" occasionally) is preferred. Use of the thermoplastic polyurethane having an isocyanate-reactive functional group, allows the active crosslinking reaction with the polyisocyanate released from the heat reactive microcapsule, thus the abrasion-resistance and the durability of the resultant cover are further improved. Examples of the isocyanate-reactive functional group include a hydroxyl group, an amino group, an imino group, a thiol group and a carboxyl group. In the present invention, the thermoplastic polyurethane having the hydroxyl group as the isocyanate-reactive functional group is preferably used.

The polyisocyanate component constituting the thermoplastic polyurethane includes, for example, an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI) and paraphenylene diisocyanate (PPDI); and an alicyclic or aliphatic polyisocyanate such as 4,4'-dicyclohexylmethane diisocyanate (hydrogenated MDI), hydrogenated xylylenediisocyanate ($H_6XDI$) hexamethylene diisocyanate (HDI), isophorone diisocyanate (IPDI), and norbornene diisocyanate (NBDI). The polyisocyanate can be used either alone or in combination of two or more.

In order to improve the abrasion-resistance, it is preferable to use the aromatic polyisocyanate as the polyisocyanate component of the thermoplastic polyurethane. The use of the aromatic polyisocyanate improves the mechanical properties of the resultant polyurethane, thereby providing the cover with the excellent abrasion-resistance. In view of improving the weather resistance, non-yellowing polyisocyanate (TMXDI, XDI, HDI, $H_6XDI$, IPDI $H_{12}MDI$, and NBDI) are preferably used and 4,4'-dicyclohexylmethane diisocyanate ($H_{12}MDI$) is more preferably used. Since 4,4'-dicyclohexylmethane diisocyanate ($H_{12}MDI$) has a rigid structure, the mechanical property of the resultant polyurethane is improved, and thus the cover excellent in the abrasion-resistance is obtained.

The polyol component constituting the thermoplastic polyurethane is not limited, as long as it has at least two hydroxyl groups. The polyol includes, for example, a low-molecular weight of polyol and a high-molecular weight of polyol. Examples of the low-molecular weight of polyol are a diol such as ethylene glycol, diethylene glycol, triethylene glycol, 1,3-butanediol, 1,4-butanediol, neopentyl glycol, 1,6-hexanediol; or a triol such as glycerin, trimethylol propane, and hexanetriol; a tetraol or hexaol such as pentaerythritol and sorbitol. Examples of the high-molecular weight of polyol are a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyol can be used individually or in combination of at least two of them.

The high-molecular-weight polyol preferably has, without limitation, the average molecular weight of 400 or more, more preferably 1,000 or more. If the molecular weight of the high-molecular weight polyol is too small, the resultant polyurethane becomes too hard, thereby worsening the shot feeling of the golf ball. The high-molecular-weight polyol has no limitation on the upper limit of the average molecular weight, but the high-molecular-weight polyol preferably has the average molecular weight of 10,000 or less, more preferably 8,000 or less.

The polyamine that constitutes the thermoplastic polyurethane where necessary may include any polyamine as long as it has at least two amino groups. The polyamine includes an aliphatic polyamine such as ethylenediamine, propylenediamine, butylenediamine, and hexamethylenediamine, an alicyclic polyamine such as isophoronediamine and piperazine, and an aromatic polyamine.

The aromatic polyamine used in the present invention has no limitation, as long as it has at least two amino groups directly or indirectly bonded to an aromatic ring. Herein, the "indirectly bonded to the aromatic ring" means that the amino group is bonded to the aromatic ring, for example, via a lower alkylene group. Further, the aromatic polyamine may include a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine are a type such as phenylenediamine, toluenediamine, diethyltoluenediamine, or dimethylthiotoluenediamine where amino groups are directly bonded to an aromatic ring; and a type such as xylylenediamine where amino groups are bonded to an aromatic ring via a lower alkylene group. The polycyclic aromatic polyamine may include polyaminobenzene having at least two aminophenyl groups directly bonded to each other or a compound having at least two aminophenyl groups bonded to each other via a lower alkylene group or an alkylene oxide group. Among them, diaminodiphenylalkane having two aminophenyl groups bonded to each other via a lower alkylene group is preferable. Typically preferred are 4,4'-diaminodiphenylmethane and derivatives thereof.

The thermoplastic polyurethane having the isocyanate-reactive functional group can be obtained, for example, by using a compound having at least three isocyanate-reactive functional groups as the polyol or the polyamine component. Examples of the polyol having at least three isocyanate-reactive functional groups include a triol such as glycerin, trimethylolethane, trimethylol propane, triethanolamine, and hexanetriol; a tetraol such as pentaerythritol; a hexaol such as sorbitol. Examples of the polyamine having at least three isocyanate-reactive functional groups include a triamine such as diethylene triamine and dipropylene triamine. Examples of a compound having at least three different isocyanate-reactive functional groups include dimethylol propionic acid, dimethylol butanoic acid and diethanolamine.

Among them, a compound having functional groups with different reactivity is preferred. Examples include a compound having two amino groups and one hydroxyl group; a compound having a secondary hydroxyl group and two primary hydroxyl groups (glycerin); and a compound having two primary hydroxyl groups and a carboxyl group (dimethylolpropionic acid and dimethylol butanoic acid). By using a compound having functional groups with different reactivity, a chain extension can be conducted using functional groups having high reactivity, thereby selectively leaving the functional group having low reactivity.

The thermoplastic polyurethane preferably contains the compound having at least three isocyanate-reactive functional groups in an amount of 0.05 mass % or more, more preferably 0.10 mass % or more, even more preferably 0.15% or more, and preferably contains the compound having at least three isocyanate-reactive functional groups in an amount of 20 mass % or less, more preferably 15 mass % or less, even more preferably 10 mass % or less. Containing the compound in an amount of 0.05 mass % or more can enhance the crosslinking density of the resultant crosslinked polyurethane, while if the content of the compound is too high, the crosslinking density of the resultant crosslinked polyurethane becomes too high. As a result, the shot feeling of the golf ball may be lowered.

The thermoplastic polyurethane has no limitation on the constitutional embodiments thereof. Examples of the constitutional embodiments are the embodiment where the polyurethane is composed of the polyisocyanate component and the high-molecular weight polyol; the embodiment where the polyurethane is composed of the polyisocyanate component, the high-molecular weight polyol and the low-molecular weight polyol; and the embodiment where the polyurethane is composed of the polyisocyanate component, the high-molecular weight polyol, the low-molecular weight polyol, and the polyamine; and the embodiment where the polyurethane is composed of the polyisocyanate component, the high-molecular weight polyol and the polyamine.

Specific examples where the heat reactive microcapsule encapsulating 4,4'-diphenylmethane diisocyanate is dispersed in the thermoplastic polyurethane having a hydroxyl as the isocyanate-reactive functional group are "U-Brid(trade mark) UB800" and "U-Brid(trade mark) UB900" available from Okada Engineering Co.

The present invention also provides a process for preparing a golf ball comprising the steps of molding a cover from a cover composition comprising a thermoplastic polyurethane and a heat reactive microcapsule encapsulating a polyisocyanate to produce a golf ball body, and heating the golf ball body, thereby allowing a crosslinking reaction between the polyisocyanate of the heat reactive microcapsule and the thermoplastic polyurethane. In the following, the process of the present invention is explained in detail.

In the process of molding the cover using the cover composition, without limitation, first, the thermoplastic polyurethane and the heat reactive microcapsule encapsulating the polyisocyanate are kneaded to prepare the cover composition in the form of the pellet (hereinafter "cover composition in the form of the pellet" may be referred to simply as "cover composition").

Kneading is preferably conducted using, for example, a kneader such as a double arm kneader and a twin-screw kneading extruder. Heating temperature inside the kneader may be appropriately set depending on the melt flow-starting temperature of the thermoplastic polyurethane to be blended and the softening temperature of the outer shell of the heat reactive microcapsule and the like.

Normally, the heating temperature preferably falls within the range from [the lower limit plus 20° C.] to [the upper limit plus 20° C.] of the softening temperature of the outer shell of the heat reactive microcapsule. More specifically, the heating temperature is preferably 100° C. or more, more preferably 120° C. or more, and preferably 270° C. or less, more preferably 220° C. or less. By setting the kneading temperature at 100° C. or more, the thermoplastic polyurethane and the heat reactive microcapsule can be kneaded uniformly. Further, if the kneading temperature becomes too high, the heat reactive microcapsule may possibly be broken while kneaded, and the polyisocyanate may be released. If the polyisocyanate is released, a crosslinking reaction with the thermoplastic polyurethane may proceed, resulting in gelation in the kneader.

The cover composition preferably has the pellet form, and the pellet form can be obtained, for example, by extruding the cover composition, which has been softened with a twin-screw kneading extruder, into the form of a bar, followed by cooling and cutting the bar. The methods for molding the cover material into a cover include, for example, compression molding which include previously molding the cover material into two hemispherical half shells, covering the core together with the two half shells, and subjecting the core with two half shells to the pressure molding, or a method including injection-molding the cover material directly onto the core to form a cover.

Compression molding is preferably employed. Compression molding, compared with injection molding, requires a lower temperature for heat treatment, thus it is easier to control the temperature of the heat reactive microcapsule during molding. Also, by employing compression molding, abrasion-resistance and durability of the resultant cover are further improved.

Molding of a half shell is performed either by compression molding or by injection molding, and compression molding is preferably employed. Compression molding, compared with injection molding, requires lower temperature for heating treatment, thus it is easier to control the temperature of the heat reactive microcapsule during the molding. Molding temperature for compression molding the cover material into a half shell may be appropriately set according to melt flow-starting temperature of the cover material used, the softening temperature of the thermoplastic resin which constitutes the outer shell of the heat reactive microcapsule and the like. Preferably, the molding temperature is, for example, 100° C. or more, more preferably 120° C. or more, and 180° C. or less, more preferably 170° C. or less. By setting the molding temperature of the half shell higher than the above lower limit, fluidity of the cover material is enhanced, resulting in improved durability and abrasion-resistance of the obtained cover. Also, setting the molding temperature of the half shell lower than the above upper limit can inhibit the release of the polyisocyanate from the heat reactive microcapsule while molding the half shell. Herein, the molding temperature of the half shell means the highest temperature reached at the surface of the depressed part of the mold (lower mold) from the clamping through the opening of the mold for molding the half shell. The pressure for compression molding the cover material into the half shell is preferably, for example, 0.5 MPa or more, more preferably 1 MPa or more, and 25 MPa or less, more preferably 15 MPa or less. By setting the molding pressure within the range from 0.5 MPa to 25 MPa, a golf ball cover having a uniform thickness can be formed.

Further, molding time for compression molding the cover material into the half shell is preferably 30 minutes or less, more preferably 20 minutes or less, even more preferably 10 minutes or less, further preferably 5 minutes or less. If molding time becomes longer, the outer shell of the microcapsule may melt and the crosslinking reaction may occur. The molding time is preferably 1 minute or more, more preferably 2 minutes or more. Because the molding time of about 1 minute is long enough for the cover material in the pellet form to flow in the mold and to be molded into the half shell. Herein, the molding time means the time from the clamping through the opening of the mold.

According to the present invention, a half shell can be molded by injection molding, too. Injection molding of the half shell is performed by charging the cover composition which has been heated and melt into upper and lower molds for molding the half shell under the pressure of 3 MPa to 10 MPa followed by cooling. The temperature of injection molding may be appropriately set according to the melt flow-starting temperature of the cover composition used, the softening point of the thermoplastic resin which constitutes the outer shell of the heat reactive microcapsule and the like. Preferably, the injection molding temperature is, for example, 100° C. or more, more preferably 120° C. or more, even more preferably 140° C. or more, and 270° C. or less, more preferably 250° C. or less, even more preferably 230° C. or less.

By setting the injection molding temperature at 100° C. or higher, fluidity of the cover composition is enhanced, and thus the moldability is improved. Setting the injection molding temperature at 270° C. or lower can inhibit the release of the polyisocyanate from the heat reactive microcapsule while molding the half shell. The injection molding temperature means the highest temperature of the cover composition reached until the molding is completed after the cover composition in the form of pellet is charged into a cylinder of the injection molding extruder.

The methods of molding the cover by using the half shell obtained as described above include, for example, compression molding the core covered with two half shells. The molding temperature of molding the half shell covering the core into the cover is preferably 100° C. or more, more preferably 120° C. or more, and preferably 180° C. or less, more preferably 170° C. or less. Because, by setting the molding temperature within the range from 100° C. to 180° C., an appropriate fluidity can be ensured so that the cover having a uniform thickness can be molded.

The pressure for compression molding the half shell into the cover is preferably, for example, 0.5 MPa or more, more preferably 1 MPa or more, and preferably 25 MPa or less, more preferably 15 MPa or less. By setting the molding pressure within the range from 0.5 MPa to 25 MPa, the golf ball cover having a uniform thickness can be molded.

Molding time for compression molding the half shell into the cover is preferably 30 minutes or less, more preferably 20 minutes or less, even more preferably 10 minutes or less. If molding time becomes longer, the outer shell of the microcapsule may melt and the crosslinking reaction may occur. The molding time is preferably 1 minute or more, more preferably 2 minutes or more, because during the molding time of about 1 or 2 minutes, half shells can be molded into the cover. Herein, the molding time means the time from the clamping through the opening of the mold.

According to the present invention, the crosslinking reaction also occurs on a seam face which is formed when the cover is molded from the half shells; thus, the durability of the cover is further improved.

In the present invention, the cover can be molded by injection molding the cover material on the core. In this case, the upper and lower molds for forming the cover preferably have a spherical cavity with pimples. Preferably, the part of the pimples can serve as a hold pin which is retractable. When molding a cover by injection molding, the hold pins are protruded to hold the core, and the cover composition heated and melt is charged into the mold, followed by cooling. For example, the cover composition which has been melt after being heated at a temperature of 200° C. to 250° C. is charged into the mold under the pressure of 9 MPa to 15 MPa in 0.5 to 5 seconds followed by cooling for 10 to 60 seconds before the mold is opened.

Preferably, the golf ball body having a molded cover is discharged from the mold, and may be subjected to the surface treatment such as deburring, cleaning or sandblast as required. Further, a paint layer and a mark can also be formed if desired.

In the present invention, the golf ball body obtained as described above is subjected to the heat treatment, thereby conducting the crosslinking reaction between the thermoplastic polyurethane and the polyisocyanate of the heat reactive microcapsule in the cover after the molding of the cover. In the present invention, the polyisocyanate may occasionally be released from the heat reactive microcapsule during the molding of the cover, but under a normal condition of molding a cover, the crosslinking reaction between the released polyisocyanate and the thermoplastic polyurethane hardly proceeds. In order to promote the crosslinking reaction between the released polyisocyanate and the thermoplastic polyurethane, the golf ball body is preferably subjected to the heat treatment under the conditions described later after molding the cover.

The conditions of the heat treatment are not limited as long as the crosslinking reaction can occur. For example, the heat treatment is preferably performed at a temperature of 70° C. or more for 12 hours or more, more preferably at a temperature of 70° C. to 130° C. for 12 hours to 168 hours (1 week). More specifically, the heat treatment is preferably performed, for example, at a relatively lower temperature of 70° C. to 90° C. for 30 hours to 168 hours, or at a relatively higher temperature of 110° C. to 130° C. for 12 hours to 40 hours. By appropriately selecting the conditions of the heat treatment, a golf ball which is even more excellent in abrasion-resistance, resilience and durability can be obtained. In the present invention, the presence of the crosslinking reaction between the released polyisocyanate and the thermoplastic polyurethane can be confirmed by checking the changes of such physical properties as tensile strength and elongation. Normally, tensile strength and elongation are enhanced when the crosslinking reaction occurs.

The golf ball of the present invention has no limitation on its structure and includes a two-piece golf ball comprising a core and a cover which covers the core; a three-piece golf ball comprising a core having a center and an intermediate layer which covers the center and a cover which covers the core; a multi-piece golf ball comprising at least four layers; and a wound-core golf ball.

In the present invention, the cover of the golf ball contains, as the base resin, the crosslinked polyurethane which is obtained by heating and reacting the cover composition comprising the thermoplastic polyurethane and the heat reactive microcapsule encapsulating the polyisocyanate. The content of the crosslinked polyurethane in the resin composition constituting the cover is preferably 50 mass % or more, more preferably 70 mass % or more, even more preferably 90 mass % or more. Further, it is also preferable that the resin composition constituting the cover essentially consists of the crosslinked polyurethane.

In the present invention, examples of the resin composition constituting the cover include a thermoplastic resin, a thermoplastic elastomer and a diene type block copolymer in addition to the crosslinked polyurethane. Examples of the thermoplastic resin include an ionomer resin. Examples of the ionomer resin are one prepared by neutralizing at least a part of carboxyl groups in a copolymer composed of ethylene and α,β-unsaturated carboxylic acid with a metal ion, and one prepared by neutralizing at least a part of carboxyl groups in a terpolymer composed of ethylene, α,β-unsaturated carboxylic acid and α,β-unsaturated carboxylic acid ester with a metal ion, or the mixture thereof. Examples of the ionomer resins include HIMILAN available from MITSUI-DUPONT POLYCHEMICAL CO., SURLYN available from DUPONT CO. and IOTEK available from Exxon Co.

Examples of the thermoplastic elastomer are a polyamide elastomer having a commercial name "PEBAX", for example "PEBAX 2533", available from ARKEMA Inc, a polyester elastomer having a commercial name of "HYTREL", for example "HYTREL 3548", "HYTREL 4047", available from DU PONT-TORAY Co., a polystyrene elastomer having a commercial name "Rabalon" available from Mitsubishi Chemical Co. Among them, the thermoplastic polystyrene elastomer is preferable. The thermoplastic polystyrene elastomer includes, for example, a polystyrene-diene block copolymer comprising a polystyrene block component as a hard segment and a diene block component, for example polybutadiene, isoprene, hydrogenated polybutadiene, hydrogenated polyisoprene, as a soft segment. The polystyrene-diene block copolymer comprises a double bond derived from a conjugated diene compound of block copolymer or hydrogenated block copolymer. Examples of the polystyrene-diene block copolymer are a block copolymer having a SBS (styrene-butadiene-styrene) comprising polybutadiene block; and a block copolymer having a SIS (styrene-isoprene-styrene) structure.

The cover composition may further include a pigment such as titanium oxide and a blue pigment; a gravity adjusting agent such as barium sulfate and calcium carbonate; a dispersant, an antioxidant, an ultraviolet absorber, a light stabilizer, a fluorescent material, and a fluorescent brightener in addition to the above resin component, unless they impart any undesirable property to the cover.

In one preferable embodiment of the present invention, the cover of the present invention has the slab hardness of 20D or more, more preferably 25D or more, even more preferably 30D or more, and has the slab hardness of 60D or less, more preferably 55D or less, even more preferably 50D or less in shore D hardness. The cover having the slab hardness of 20D or more enhances the rigidity of the resultant cover and provides a golf ball with the excellent resilience (flight distance). On the other hand, the cover having the slab hardness of 60D or less enhances the shot feeling when the golf ball is hit. Herein, the slab hardness of the cover means the hardness measuring the hardness of the cover composition molded into the sheet (slab) shape. The details of the method to measure the slab hardness is described later. The slab hardness of the cover can be adjusted, for example, by appropriately selecting the structural component of the crosslinked polyurethane, the degree of cross-linkage, and the amount of the filler contained.

In the present invention, the cover of the golf ball preferably has a thickness of 2.0 mm or less, more preferably 1.6 mm or less, even more preferably 1.0 mm or less. The cover having a thickness of 2.0 mm or less can impart the resilience to a golf ball, which is necessary to improve the flight distance of the ball. The lower limit of the thickness of the cover is for example, but is not limited to, 0.1 mm because it may be difficult to form the cover layer with the thickness of less than 0.1 mm.

In the following, the core or the center of the golf ball of the present invention will be explained. The conventional rubber composition (hereinafter referred to simply as rubber composition for the core) can be used for the core or the center of a golf ball. For example, the core or the center can be molded by heat-pressing the rubber composition comprising a diene rubber as a base rubber, a co-crosslinking agent, and a crosslinking initiator.

Examples of the diene rubber are butadiene rubber (BR), ethylene-propylene-diene terpolymer (EPDM), isoprene rubber (IR), styrene-butadiene rubber (SBR), and acrylonitrile-butadiene rubber (NBR). Among them, butadiene rubber, particularly cis-1,4-polybutadiene, is preferable in view of its superior repulsion property. Typically preferred is the high cis-polybutadiene rubber having cis-1,4 bond in a proportion of not less than 40%, more preferably not less than 70%, even more preferably not less than 90%. The co-crosslinking agent used in the present invention includes, for example, an α,β-unsaturated carboxylic acid or a metal salt thereof. Typically preferred is the α,β-unsaturated carboxylic acid having 3 to 8 carbon atoms such as acrylic acid and methacrylic acid or the metal salt thereof. As the metal forming the metal salt of the α,β-unsaturated carboxylic acid, a monovalent or divalent metal such as zinc, magnesium, calcium, aluminum and sodium is preferably used. Among them, zinc is preferable, because it can impart the higher repulsion property to the golf ball. The amount of the co-crosslinking agent to be blended in the rubber composition is preferably 20 to 50 parts by mass based on 100 parts by mass of the base rubber.

As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. The amount of the organic peroxide to be blended in the rubber composition is preferably not less than 0.2 part by mass, more preferably not less than 0.3 part by mass, and preferably not more than 1.5 parts by mass, more preferably not more than 1.0 part by mass based on 100 parts by mass of the base rubber. The rubber composition for the core may further include a diphenyl disulfide or a derivative thereof. The amount of the diphenyl disulfide or the derivative thereof to be blended is preferably 0.1 parts or more, more preferably 0.3 parts or more, and is preferably 5.0 parts or less, more preferably 3.0 parts or less with respect to 100 parts by mass of the base rubber.

The rubber composition for the core may further contain a specific gravity adjusting agent such as zinc oxide and barium sulfate, an antioxidant, a color powder, and the like, as required in addition to the base rubber, the co-crosslinking agent, the crosslinking initiator, and diphenyl disulfide or the derivative thereof. The conditions for press-molding the rubber composition should be determined depending on the rubber composition. The press-molding is preferably carried out for 10 to 60 minutes at a temperature of 130 to 200° C. Alternatively, the press-molding is preferably carried out in a two-step heating, for example, for 20 to 40 minutes at a temperature of 130 to 150° C., and continuously for 5 to 15 minutes at a temperature of 160 to 180° C.

The core used in the golf ball of the present invention (which means the inner part of the golf ball without the cover constituting the outermost layer) preferably has a diameter of not less than 39 mm, more preferably not less than 39.5 mm, even more preferably not less than 40.8 mm, and preferably not more than 42.2 mm, more preferably not more than 42 mm, even more preferably not more than 41.8 mm. If the diameter of the core is less than the above lower limit, the cover becomes so thick that the resilience is lowered, while if the diameter of the core is more than the above upper limit, the cover becomes so thin that the molding of the cover becomes difficult.

In the present invention, the core having the surface hardness which is greater than the center hardness (the core having the surface hardness of the outermost layer which is greater than the center hardness if the core consists of multiple layers) is preferably used. Making the surface hardness of the core greater than the center hardness enhances the launch angle and lowers the amount of spin, thus the flight distance of the golf ball is improved. In this respect, the hardness difference between the surface and the center of the core used for the golf ball of the present invention is preferably 20 or more, more preferably 25 or more, and preferably 40 or less, more preferably 35 or less. If the hardness difference is less than the above lower limit, the flight distance tends to be lowered because it is difficult to obtain an increased launch angle and a low amount of spin. Further, because the impact strength becomes high when hitting the golf ball, it is difficult to obtain a soft and good shot feeling. On the other hand, if the hardness difference is greater than the above upper limit, durability tends to be lowered.

The center hardness of the core is preferably not less than 30D, more preferably not less than 32D, even more preferably not less than 35D, and is preferably not more than 50D, more preferably not more than 48D, and even more preferably not more than 45D in shore D hardness. If the center hardness is less than the above lower limit, the core becomes so soft that the resilience tends to be lowered, while if it is more than the above upper limit, the core becomes so hard that such problems as lowered shot feeling, lowered launch angle, and lowered flying performance due to an increased amount of spin may occur. Herein, the center hardness of the core means the hardness measured using the Shore D type spring hardness tester at the central point of the cut surface of the core which has been cut into two halves.

The surface hardness of the core is preferably not less than 45D, more preferably not less than 50D, and even more preferably not less than 55D, and is preferably not more than 65D, more preferably not more than 62D, even more preferably not more than 60D in shore D hardness. If the surface hardness is less than the above lower limit, the core becomes so soft that problems such as lowered resilience and launch angle and the lowered flying performance due to increased amount of spin may occur. If the surface hardness is more than the above upper limit, the core becomes so hard that the shot feeling may become lowered. Herein, the surface hardness of the core means the hardness measured on the surface of the obtained core in the spherical shape using the Shore D type spring hardness tester. Further, if the core consists of multiple layers, the surface hardness of the core means the surface hardness of the outermost layer of the core.

When preparing a multi-piece golf ball comprising at least three layers, the intermediate layer includes, for example, a thermoplastic resin such as a polyurethane resin, an ionomer resin, Nylon, and a polyethylene; a thermoplastic elastomer such as a polystyrene elastomer, a polyolefin elastomer, a polyurethane elastomer, a polyester elastomer, and a polyamide elastomer. Among them, an ionomer resin is preferably used.

Examples of the ionomer resin are one prepared by neutralizing at least a part of carboxyl groups in a copolymer composed of ethylene and α,β-unsaturated carboxylic acid with a metal ion, and one prepared by neutralizing at least a part of carboxyl groups in a terpolymer composed of ethylene, α,β-unsaturated carboxylic acid and α,β-unsaturated carboxylic acid ester with a metal ion, and a mixture thereof.

Examples of the α,β-unsaturated carboxylic acid are acrylic acid, methacrylic acid, fumaric acid, maleic acid, and crotonic acid. Acrylic acid and methacrylic acid are preferable. Examples of the α,β-unsaturated carboxylic acid ester are methyl ester, ethyl ester, propyl ester, n-butyl ester, isobutyl ester and the like of acrylic acid, methacrylic acid, fumaric acid, and maleic acid. Especially, the ester of acrylic acid and methacrylic acid are preferable. The metal ion for neutralizing at least a part of the carboxyl groups of includes an alkali metal ion such as sodium, potassium, and lithium; a divalent metal ion such as magnesium, calcium, zinc, barium, and cadmium; a trivalent metal ion such as aluminum, or other metal ions such as tin, and zirconium. Among them, sodium, zinc, and magnesium are preferably used.

Specific examples of the ionomer resin are, but not limited to, HIMILAN 1555(Na), HIMILAN 1557(Zn), HIMILAN 1605(Na), HIMILAN 1706(Zn), HIMILAN 1707(Na), HIMILAN AM7311(Mg), and examples of the terpolymer ionomer resin are HIMILAN 1856(Na) and HIMILAN 1855 (Zn) available from MITSUI-DUPONT POLYCHEMICAL CO.

Examples of the ionomer resins available from DUPONT CO. are SURLYN 8945(Na), SURLYN 9945(Zn), SURLYN 8140(Na), SURLYN 8150(Na), SURLYN 9120(Zn), SURLYN 9150(Zn), SURLYN 6910(Mg), SURLYN 6120(Mg), SURLYN 7930(Li), SURLYN 7940(Li), SURLYN AD8546 (Li), and examples of the terpolymer ionomer resin are SURLYN 8120(Na), SURLYN 8320(Na), SURLYN 9320(Zn), and SURLYN 6320(Mg).

Examples of the ionomer resins available from Exxon Co. are IOTEK 8000(Na), IOTEK 8030(Na), IOTEK 7010(Zn), IOTEK 7030 (Zn), and examples of the terpolymer ionomer resin are IOTEK 7510(Zn), and IOTEK 7520(Zn). These ionomers may be used individually or as a mixture of two or more of them. Na, Zn, K, Li, or Mg described in the parentheses after the commercial name of the ionomer resin represent a kind of metal used for neutralization.

In addition to the above resin component, the intermediate layer may further include a gravity adjusting agent such as barium sulfate and tungsten, an antioxidant, a pigment and the like.

For preparing a wound golf ball, a wound core can be used in the present invention. The wound core may comprise a center which is formed by curing the rubber composition for the core and a rubber thread layer which is formed by winding a rubber thread around the center in an elongated state. In the present invention, the rubber thread, which is conventionally used for winding around the center, can be adopted for winding around the center. The rubber thread, for example, is obtained by vulcanizing a rubber composition including a natural rubber, or a mixture of natural rubber and a synthetic polyisoprene, a sulfur, a vulcanization auxiliary agent, a vulcanization accelerator, and an antioxidant. The rubber thread is wound around the center in elongation of about 10 times length to form the wound core.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Method]

(1) Abrasion-Resistance

A commercially available pitching wedge was installed on a swing robot available from Golf laboratory Co., and two points of a ball respectively were hit once at the head speed of 36 m/sec. to observe the areas which were hit. Abrasion-resistance was evaluated and ranked into four levels based on following criteria.

E (Excellent): Almost no scratch is present on the surface of the golf ball.

G (Good): Slight scratches were present on the surface of the golf ball, but no scuffing was present.

F (Fair): Scratches were clearly left on the surface of the golf ball, and a little scuffing could be observed.

P (Poor): The surface of the golf ball was abraded considerably, and scuffing was conspicuous.

(2) Resilience

Aluminum cylinder having a weight of 200 g was collided with the resultant golf ball at the speed of 45 m/sec. to measure the speed of the cylinder and the golf ball before and after the collision. The repulsion coefficient of each golf ball was obtained based on each of the measured speed and weight. Each golf ball was measured 5 times to obtain the average. The repulsion coefficient measured in terms of each golf ball is reduced to an index number relative to the measured value obtained in Golf ball No. 4 whose repulsion coefficient is assumed 100. The higher value of repulsion index indicates higher resilience.

(3) Durability

Each golf ball was repeatedly hit with a metal head driver (W#1) attached to a swing robot manufactured by TRU-ETEMPER CO, at the head speed of 45 m/sec. to make the golf ball collide with a collision board. Times up to which the golf balls are cracked were measured. In addition, each value obtained was reduced to an index number relative to the measured value obtained in Golf ball No. 4 being assumed 100. The larger number indicates better durability.

(4) Slab Hardness of the Cover (Shore D Hardness)

Using the cover composition, a sheet having a thickness of about 2 mm were prepared by hot press molding and preserved at the temperature of 23° C. for two weeks. After that, the sheets were subjected to heat treatment at the temperature of 130° C. for 12 hours. Three or more of the sheets were stacked on one another to avoid being affected by the measuring substrate on which the sheets were placed, and the stack was subjected to the measurement using P1 type auto hardness tester provided with the Shore D type spring hardness tester prescribed by ASTM-D2240, available from KOUBUNSHI KEIKI CO., LTD.

[Production of the Golf Ball]

(1) Preparation of the Center

The rubber composition for the center shown in Table 1 was kneaded and pressed in upper and lower molds each having a spherical cavity at the heating condition of 170° C. for 15 minutes to obtain the center in a spherical shape having a diameter of 38.5 mm and a mass of 34.9 g.

TABLE 1

| Center composition | Amount (parts) |
| --- | --- |
| Polybutadiene rubber | 100 |
| Zinc acrylate | 35 |
| Zinc oxide | 5.0 |
| Diphenyl disulfide | 0.5 |
| Dicumyl peroxide | 1 |
| Center hardness of center (core) (Shore D) | 40 |

Notes on Table 1:
Polybutadiene rubber: BR-730 (high cis-polybutadiene) available from JSR Co.
Zinc acrylate: "ZNDA-90S" available from NIHON JYORYU KOGYO Co, .LTD.
Zinc oxide: "Ginrei R" available from Toho-Zinc Co.
Dicumyl peroxide: "Percumyl D" available from NOF Corporation
Diphenyl disulfide: available from Sumitomo Seika Chemicals Company Limited (2) Blending of Materials for Intermediate Layer and Cover Next, materials for the intermediate layer and the cover were mixed as shown in Tables 2 and 3 by a twin-screw kneading extruder to prepare the intermediate layer material and the cover composition in the form of pellet. The extrusion was conducted in the following conditions: screw diameter=45 mm, screw revolutions=200 rpm, screw L/D=35. The blended material was heated at the temperature ranging from 150° C. to 230° C. at the die position of the extruder.

TABLE 2

| Intermediate layer composition | Amount (parts) |
| --- | --- |
| HIMILAN 1605 | 50 |
| HIMILAN AM7329 | 50 |
| Slab hardness of intermediate layer (Shore D hardness) | 64 |

Notes on Table 2:
HIMILAN 1605: an ionomer resin of a sodium ion-neutralized ethylene-methacrylic acid copolymer, available from MITSUI-DUPONT POLY-CHEMICAL
HIMILAN N47329: an ionomer resin of a zinc ion-neutralized ethylene-methacrylic acid copolymer available from MITSUI-DUPONT POLY-CHEMICAL The materials for the intermediate layer were injection molded on the center which had been obtained as described above to prepare a core comprising the center and the intermediate layer (a thickness of 1.6 mm) covering the center.

(3) Molding of Half Shells

Compression molding of half shells were performed by charging the pellet-form cover composition obtained as described above into each of the depressed part of the lower mold for molding half shells, and applying pressure to mold half shells. Compression molding was conducted at the temperature of 170° C. for 5 minutes under the molding pressure of 2.94 MPa.

(4) Molding of a Cover

The core obtained in (2) was covered with two half shells obtained in (3) in a concentric manner and the cover (thickness of 0.5 mm) was molded by compression molding. Compression molding was performed at the temperature of 150° C. for 2 minutes under the molding pressure of 9.8 MPa.

The surface of the resulting golf ball body was subjected to sandblast treatment and marking followed by coating clear paint and drying the paint in an oven at the temperature of 40° C. to obtain a golf ball having a diameter of 42.7 mm and a weight of 45.3 g. The obtained golf ball was subjected to heat treatment under the conditions shown in Table 3 to bring about the crosslinking reaction between the thermoplastic polyurethane and the polyisocyanate of the heat reactive microcapsule. Abrasion-resistance, durability and appearance of the resultant golf ball were evaluated and the results were also shown in Table 3.

TABLE 3

| Golf Ball No. | No.1 | No.2 | No.3 | No.4 | No.5 | No.6 |
|---|---|---|---|---|---|---|
| Cover Material | | | | | | |
| UB800 | 100 | — | — | — | — | — |
| UB900 | — | 100 | 100 | 100 | 100 | 100 |
| Elastollan XNY97A | — | — | — | — | — | — |
| Elastollan XNY90A | — | — | — | — | — | — |
| PANDEX T8290 | — | — | — | — | — | — |
| EM30 | — | — | — | — | — | — |
| Titanium oxide | 4 | 4 | 4 | 4 | 4 | 4 |
| Ultramarine blue | 0.1 | 0.1 | 0.1 | 0.1 | 0.1 | 0.1 |
| Molding Process | | | | | | |
| Half Shell | compression | compression | compression | compression | compression | compression |
| Cover | compression | compression | compression | compression | compression | compression |
| Heat treatment temperature after molding the cover (° C.) | 70 | 23 | 50 | 70 | 70 | 130 |
| Heat treatment time after molding the cover (hrs) | 84 | 84 | 54 | 12 | 84 | 12 |
| Property | | | | | | |
| Slub hardness (Shore D) of the cover | 30 | 37 | 37 | 38 | 38 | 39 |
| Abraision Resistance | E | F | G | E | E | E |
| Resilience | 100 | 98 | 99 | 100 | 101 | 103 |
| Durability | 103 | 99 | 99 | 100 | 105 | 110 |

| Golf Ball No. | No.7 | No.8 | No.9 | No.10 | No.11 |
|---|---|---|---|---|---|
| Cover Material | | | | | |
| UB800 | — | — | — | — | — |
| UB900 | — | — | — | — | — |
| Elastollan XNY97A | 100 | 100 | 100 | — | — |
| Elastollan XNY90A | — | — | — | 100 | — |
| PANDEX T8290 | — | — | — | — | 100 |
| EM30 | — | — | — | — | 10 |
| Titanium oxide | 4 | 4 | 4 | 4 | 4 |
| Ultramarine blue | 0.1 | 0.1 | 0.1 | 0.1 | 0.1 |
| Molding Process | | | | | |
| Half Shell | compression | compression | — | compression | compression |
| Cover | compression | compression | Injection | compression | compression |
| Heat treatment temperature after molding the cover (° C.) | none | 70 | none | none | none |
| Heat treatment time after molding the cover (hrs) | none | 84 | none | none | none |
| Property | | | | | |
| Slub hardness (Shore D) of the cover | 49 | 49 | 49 | 38 | 39 |
| Abraision Resistance | F | F | P | F | P |
| Resilience | 96 | 96 | 94 | 95 | 95 |
| Durability | 89 | 89 | 84 | 92 | 81 |

Formulation: parts by mass

Notes on Table 3:

UB800: material in which the heat reactive microcapsule encapsulating 4,4'-diphenylmethane diisocyanate is dispersed in the thermoplastic polyurethane having a hydroxyl group, available from Okada Engineering Co., Ltd, JIS-A hardness of 80

UB900: material in which the heat reactive microcapsule encapsulated 4,4'-diphenylmethane diisocyanate is dispersed in the thermoplastic polyurethane having a hydroxyl group, available from Okada Engineering Co., Ltd JIS-A hardness of 90, wear-resistance of 3 mg (JIS K7311)

Elastollan XNY97A: 4,4'-dicyclohexylmethane diisocyanate-polyoxytetramethylene glycol-based thermoplastic polyurethane elastomer available frfom BASF POLYURETHANE ELASTOMERS Co., JIS-A hardness of 97

Elastollan XNY90A: 4,4'-dicyclohexylmethane diisocyanate-polyoxytetramethylene glycol-based thermoplastic polyurethane elastomer, JIS-A hardness of 90, wear-resistance of 30 mg (JIS k7311) available from BASF POLYURETHANE ELASTOMERS Co.

PANDEX T8290: 4,4'-diphenylmethane diisocyanate-polytetramethylene glycol-based thermoplastic polyurethane elastomer (JI-A hardness 90) available from DIC Bayer Polymer Ltd.

EM30: isocyanate master batch available from Dainichiseika Color & Chemicals Mfg. Co., Ltd., wherein MDI is dispersed in a polyester elastomer, MDI content of 30 mass %.

Golf balls No. 1 to No. 6 in Table 3 were obtained by forming the cover using the cover composition having the thermoplastic polyurethane and the heat reactive microcapsule encapsulating the polyisocyanate to prepare a golf ball body, followed by heating the between the polyisocyanate of the heat reactive microcapsule and thermoplastic polyurethane. Compared with the conventional golf balls No. 7 to No. 11, it is apparent that the golf balls No. 1 to No. 6 were excellent in abrasion-resistance, resilience and durability. Specifically, the durability of the golf ball of the present invention was remarkably improved compared with conventional golf balls. Further, as apparent from the results of golf balls No. 1 and No. 4 to No. 6, heat treatment at the temperature of at least 70° C. for at least 12 hours further improved the abrasion-resistance and the durability. Golf balls No. 7, No. 8 and No. 10 had a cover using the conventional thermoplastic polyurethane, whose abrasion-resistance, resilience and durability were inadequate. Further, the golf ball No. 9 was prepared by injection molding the cover material on the core. Compared with compression molding method (No. 7), abrasion-resistance and durability proved to be lowered. The Golf ball No. 11 had a cover comprising the crosslinked polyurethane as the base resin wherein the thermoplastic polyurethane was crosslinked using the isocyanate master batch having MDI dispersed in the polyester elastomer resin, and both abrasion-resistance and durability of the ball were low. It was probably because the crosslinking reaction proceeded excessively during the molding of the cover so that the moldability of the cover was lowered.

The present invention provides a golf ball which is excellent in abrasion-resistance, durability and resilience.

This application is based on Japanese Patent application No. 2005-363753 filed on Dec. 16, 2005, the contents of which are hereby incorporated by reference.

What is claimed is:

1. A golf ball comprising
a core, and
a cover containing a crosslinked polyurethane,
wherein the crosslinked polyurethane is formed by heating and reacting a cover composition comprising a thermoplastic polyurethane having a hydroxyl group and heat reactive microcapsules encapsulating a polyisocyanate, and
the heat reactive microcapsules have an outer shell comprising a thermoplastic resin having a softening point ranging from 80° C. to 250° C.

2. The golf ball according to claim 1, wherein the heat reactive microcapsule releases the polyisocyanate by a heat treatment at a temperature of 160° C. to 200° C. for 3 minutes to 10 minutes.

3. The golf ball according to claim 1, wherein the thermoplastic polyurethane has a functional group reactive with an isocyanate group.

4. The golf ball according to claim 1, wherein the cover has a slab hardness of from 20D to 60D in shore D hardness.

5. The golf ball according to claim 1, wherein the cover has a thickness of 2.0 mm or less.

6. A process for preparing a golf ball comprising the steps of:
molding a cover from a cover composition comprising a thermoplastic polyurethane and heat reactive microcapsules encapsulating a polyisocyanate to produce a golf ball body, and heating the golf ball body, thereby allowing a crosslinking reaction between the polyisocyanate of the heat reactive microcapsules and the thermoplastic polyurethane to produce a golf ball comprising a core and a cover containing a crosslinked polyurethane, wherein the heat reactive microcapsules have an outer shell comprising a thermoplastic resin having a softening point ranging from 80° C. to 250° C.

7. The process for preparing the golf ball according to claim 6, wherein a thermoplastic polyurethane having a functional group reactive with an isocyanate group is used as the thermoplastic polyurethane.

8. The process for preparing the golf ball according to claim 6, wherein the heating the golf ball body is conducted at a temperature of 70° C. or higher for 12 hours or more.

9. A process for preparing a golf ball having a core and a cover covering the core, comprising
providing a cover composition comprising a thermoplastic polyurethane and heat reactive microcapsules encapsulating a polyisocyanate,
molding the cover composition into a shell,
covering the core with at least two shells,
compression molding the core covered with at least two shells to prepare a golf ball body, and
heating the golf ball body, thereby allowing a crosslinking reaction between the polyisocyanate of the heat reactive microcapsules and the thermoplastic polyurethane to produce a golf ball comprising a core and a cover containing a crosslinked polyurethane, wherein the heat reactive microcapsules have an outer shell comprising a thermoplastic resin having a softening point ranging from 80° C. to 250° C.

10. The process for preparing the golf ball according to claim 9, wherein molding the cover composition into the shell is conducted by a compression molding at the following conditions:
molding temperature ranging from 100° C. to 180° C.,
molding pressure ranging from 0.5 MPa to 25 MPa, and
molding time ranging from 1 minute to 30 minutes.

11. The process for preparing the golf ball according to claim 9, wherein molding the cover composition into the shell is conducted by an injection molding at the following conditions:
molding temperature ranging from 100° C. to 250° C., and
molding pressure ranging from 3 MPa to 10 MPa.

12. The process for preparing the golf ball according to claim 9, wherein compression molding the core covered with at least two shells is conducted at the following conditions:
molding temperature ranging from 100° C. to 180° C.,
molding pressure ranging from 0.5 MPa to 25 MPa, and
molding time ranging from 1 minute to 30 minutes.

13. The process for preparing the golf ball according to claim 9, wherein heating the golf ball body is conducted at the following conditions:
heating temperature ranging from 70° C. to 130° C., and
heating time ranging from 12 hours to 168 hours.

14. The process for preparing the golf ball according to claim 9, wherein heating the golf ball body is conducted at the following conditions:
heating temperature ranging from 70° C. to 90° C., and
heating time ranging from 30 hours to 168 hours.

15. The process for preparing the golf ball according to claim 9, wherein heating the golf ball body is conducted at the following conditions:
heating temperature ranging from 110° C. to 130° C., and
heating time ranging from 12 hours to 40 hours.

16. The process for preparing the golf ball according to claim 9, wherein the heat reactive microcapsules release the polyisocyanate by a heat treatment at a temperature of 160° C. to 200° C. for 3 minutes to 10 minutes.

17. The process for preparing the golf ball according to claim 9, wherein the heat reactive microcapsules have an outer shell comprising a thermoplastic resin having a softening point ranging from 80° C. to 250° C.

18. The process for preparing the golf ball according to claim 9, wherein a thermoplastic polyurethane having a functional group reactive with an isocyanate group is used as the thermoplastic polyurethane.

19. A process for preparing a golf ball having a core and a cover covering the core, comprising providing a cover composition comprising a thermoplastic polyurethane and heat reactive microcapsules encapsulating a polyisocyanate, injection-molding the cover composition onto the core to prepare a golf ball body, and heating the golf ball body, thereby allowing a crosslinking reaction between the polyisocyanate of the heat reactive microcapsules and the thermoplastic polyurethane to produce a golf ball comprising a core and a cover containing a crosslinked polyurethane, wherein the heat reactive microcapsules have an outer shell comprising a thermoplastic resin having a softening point ranging from 80° C. to 250° C.

* * * * *